United States Patent
Rathbone

[11] Patent Number: 5,863,513
[45] Date of Patent: Jan. 26, 1999

[54] TREATMENT OF GAS

[75] Inventor: Thomas Rathbone, Farnham, United Kingdom

[73] Assignee: The BOC Group plc, Windlesham, England

[21] Appl. No.: 69,659

[22] Filed: Jun. 1, 1993

Related U.S. Application Data

[63] Continuation of Ser. No. 799,458, Nov. 26, 1991, abandoned.

[30] Foreign Application Priority Data

Nov. 28, 1990 [GB] United Kingdom .................... 9025846

[51] Int. Cl.[6] .............................. B01D 53/52; B01J 12/00
[52] U.S. Cl. .................................... 423/573.1; 423/574.1; 423/576.2; 423/576.8; 422/168; 422/170; 62/617; 62/922; 60/650
[58] Field of Search .................... 423/222, 242.1, 423/244.01, 574 R, 576.2, 576.8, 220, 573.1, 574.1; 62/31, 617, 640, 922; 60/650; 422/168, 170

[56] References Cited

U.S. PATENT DOCUMENTS

| | | | |
|---|---|---|---|
| 4,320,100 | 3/1982 | Engelbrecht et al. | 423/219 |
| 4,409,196 | 10/1983 | Skinner et al. | 423/359 |
| 4,501,725 | 2/1985 | Lell | 423/573 R |
| 4,670,237 | 6/1987 | Graf et al. | 423/244 |
| 4,966,002 | 10/1990 | Parker et al. | 62/31 |
| 4,988,494 | 1/1991 | Lagas et al. | 423/574 R |
| 5,132,098 | 7/1992 | Kvasnikoff et al. | 423/574 R |

FOREIGN PATENT DOCUMENTS

| | | | |
|---|---|---|---|
| 3161023 | 7/1991 | Japan | 423/242.1 |
| 2173780 | 10/1986 | United Kingdom . | |

Primary Examiner—Gary P. Straub
Assistant Examiner—Timothy C. Vanoy
Attorney, Agent, or Firm—David M. Rosenblum; Salvatore P. Pace

[57] ABSTRACT

An elevated pressure nitrogen stream from an air separation plant is used to provide cooling for one or more sulphur condensers in an oxygen-enhanced Claus process for recovering sulphur.

8 Claims, 2 Drawing Sheets

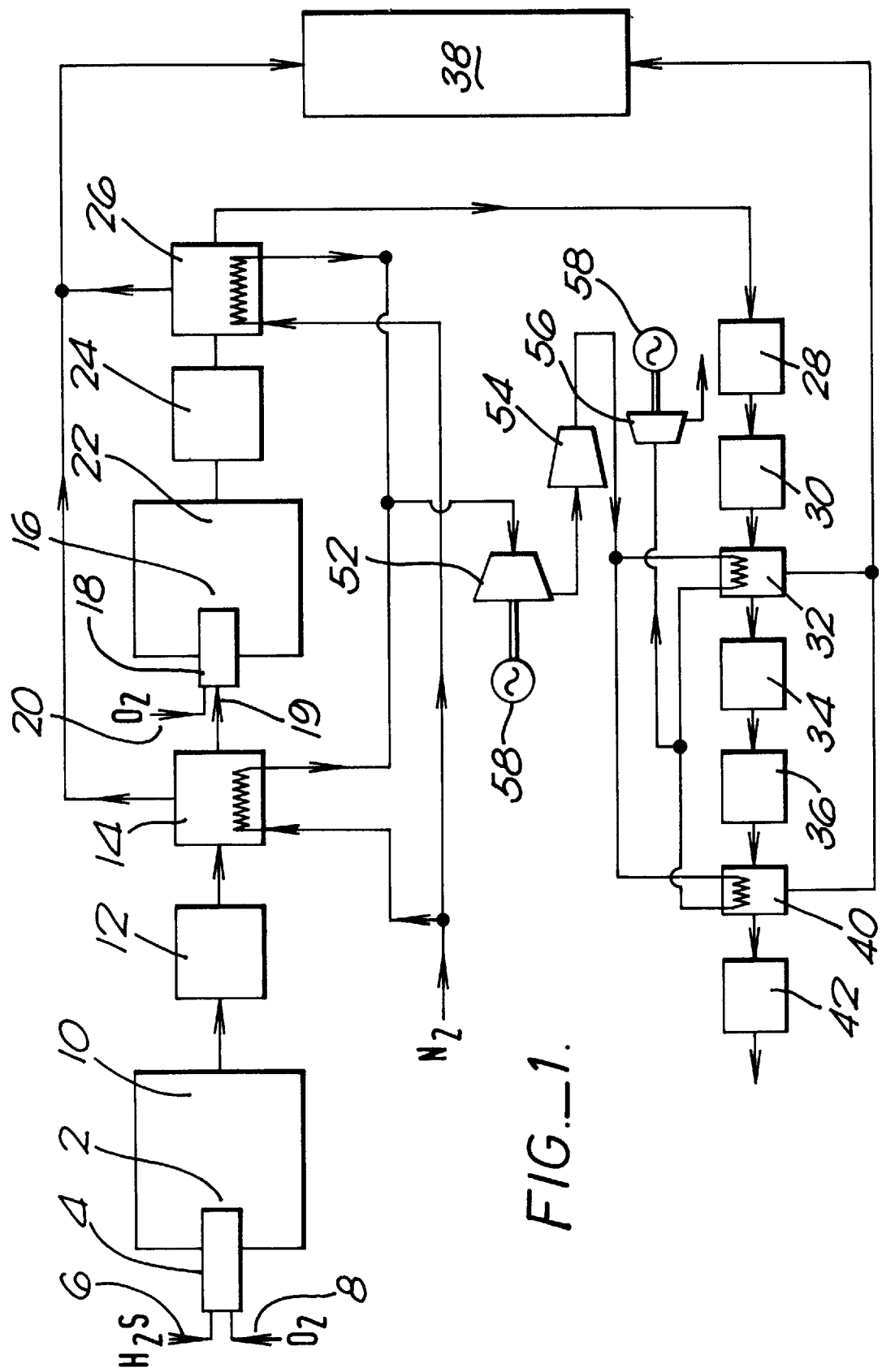
FIG._1.

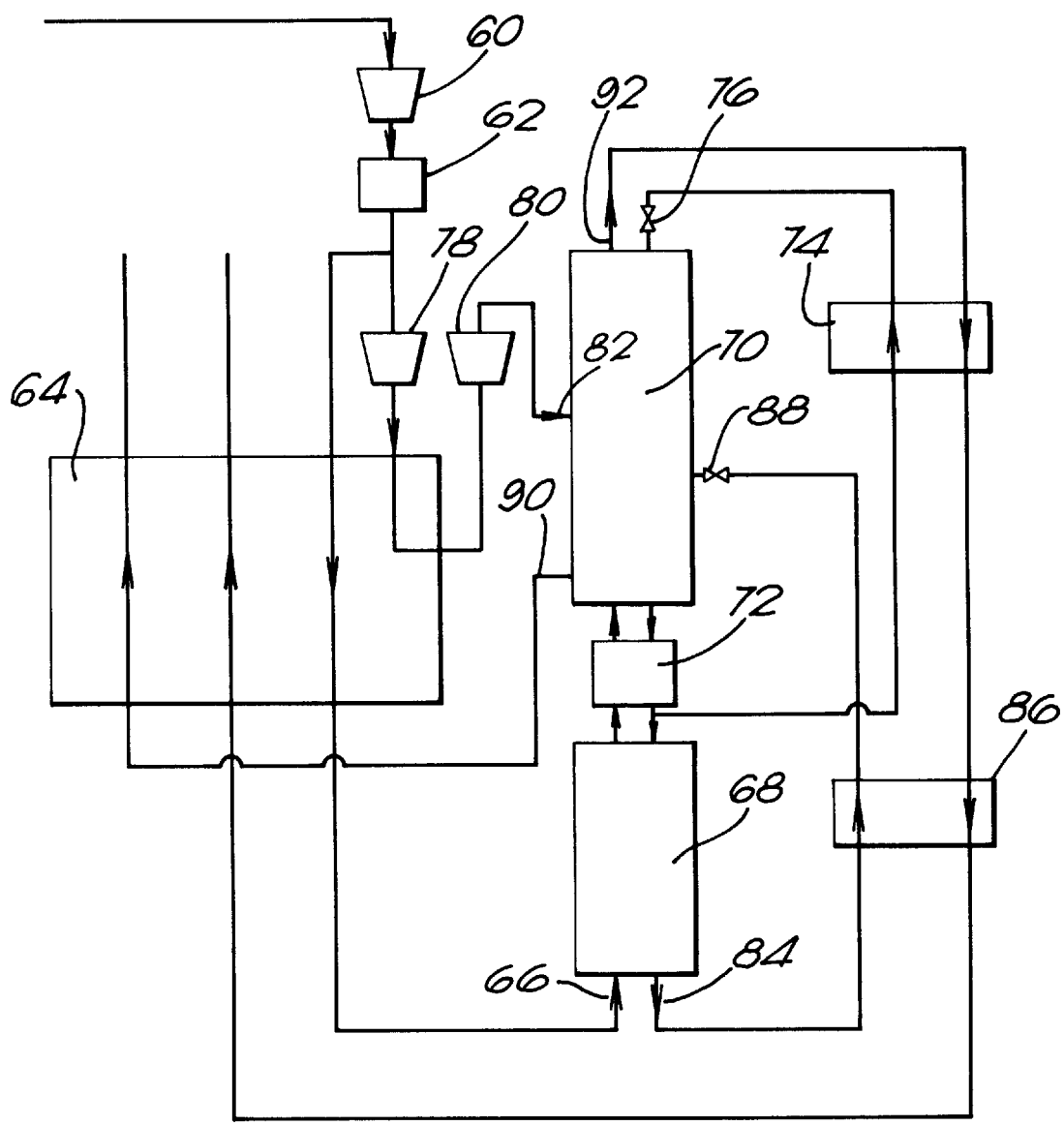

TREATMENT OF GAS

This is a continuation of application Ser. No. 07/799,458, filed Nov. 26, 1997 now abandoned.

BACKGROUND OF THE INVENTION

This invention relates to the treatment of gas. In particular, it relates to the treatment of a gas stream comprising hydrogen sulphide.

Gas streams comprising hydrogen sulphide are typically produced as waste products or by-products from many industrial processes. For example, acid gas streams comprising carbon dioxide and hydrogen sulphide are typically produced during oil refinery operations in which sulphur is removed from crude oil. It is necessary to treat such hydrogen sulphide-containing streams before discharging them to the atmosphere so as to reduce or remove all together their content of sulphur containing gases. One well known, widely practiced process for treating a gas stream comprising hydrogen sulphide is the Claus process. This process is based on the reaction between hydrogen sulphide and sulphur dioxide to form sulphur vapor and water vapor in accordance with the equation:

$$SO_2 + 2H_2S = 2H_2O + 3S$$

Sulphur exists in the vapor phase in a number of different molecular species such as $S_2$, $S_6$ and $S_8$ according to the temperature.

The first stage of the Claus process is to burn approximately a third of the hydrogen sulphide in the incoming stream to form sulphide dioxide and water vapor in accordance with the equation:

$$2H_2S + 3O_2 = 2H_2O + 2SO_2$$

This combustion reaction takes place in a suitable furnace and normally air is used a s a source of oxygen for the purposes of combustion. The furnace is designed such that reaction between the sulphur dioxide and hydrogen sulphide can start in the combustion zone and then continue downstream of the combustion zone. At the temperature that is created by the combustion of hydrogen sulphide, it is not possible to convey more than about 75% of the remaining hydrogen sulphide to sulphur by reaction with sulphur dioxide, and typically between 50 to 70% of the hydrogen sulphide is so converted. It is, however, possible to achieve higher percentage conversions in the presence of a catalyst at a reaction temperature in the order of 200° to 350° C. by reacting the remaining hydrogen sulphide and sulphur dioxide. (at such "catalytic" temperatures, the lower the temperature the higher is the percentage conversion that is achieved.) Accordingly, after the gases pass out of the so-called thermal region of the furnace they are cooled to a temperature at which the sulphur that tis form in the furnace condenses. The sulphur is thus recovered. In order to extract further sulphur, the gas stream is then subjected to a plurality of stages of catalytic reaction (between hydrogen sulphide and sulphur dioxide) with the resulting sulphur being separated downstream of each stage and the gas mixture being reheated before the next catalytic stage. By performing 2 or 3 catalytic stages, substantially all of the hydrogen sulphide is removed from the gas stream. In order to remove the last traces of hydrogen sulphide, the gas stream is passed to a so-called tail gas clean-up process of a known kind suitable for handling a relatively dilute hydrogen sulphide stream or is incinerated.

In order to improve the capacity of a Claus plant, it has been proposed to employ oxygen-enriched air to support combustion of the hydrogen sulphide in the furnace. This measure enables the proportion of nitrogen in the gas stream that flows through the plant to be reduced, and its place to be taken by additional hydrogen sulphide. In practice, however, in many plants, the amount of the uprating that can be achieved by this method is limited as there is a tendency for the reduced volume of nitrogen to lead to higher exit temperatures from the furnace than can be withstood by the waste heat boiler associated with the furnace or by the refractory lining furnace. Indeed, the more concentrated (in hydrogen sulphide) the gas stream, the less is the possibility of achieving any significant uprating merely by enrichment of the air in oxygen.

There have thus been a number of proposals in the art for improving the way in which oxygen is used in the Claus process. These proposals can be divided into two categories. In the first category, a fluid, preferably in liquid state, having a higher molar heat capacity than nitrogen is introduced into the furnace so as to moderate the temperature that occurs therein. An example of such a proposal, in which the fluid is water, is disclosed in GB 2,173,780A. The second category involves conducting the non-catalysed reactions in two or more separate furnaces. Accordingly, the heat of the combustion reaction between hydrogen sulphide and oxygen is spread over two or more separate furnaces with the result that less heat is generated in each one individually, making possible in at leas some examples the use of substantially pure oxygen rather than air or oxygen-enriched air to support combustion in each furnace.

Such is the size of a typical Claus plant that to perform such processes using oxygen, it is often preferred to have an on-site oxygen generator rather than to deliver oxygen to the site of the plant from a remote site of oxygen production. For example, a plant producing 400 tons per day of sulphur might typically require in the order of 180 tons per day of oxygen. Oxygen is typically produced in such quantities by the fractional distillation of air at cryogenic temperatures. This method inevitably produces a nitrogen by-product. Sometimes, a use can be found for the nitrogen by-product on the site of the Claus plant. On other occasions, however, there is no such use for the nitrogen by-product.

SUMMARY OF THE INVENTION

It is an aim of the present invention to provide a method and apparatus which uses both the oxygen and nitrogen products of an air separation process in a method and apparatus for recovering sulphur from a gas stream continuing hydrogen sulphide.

According to the present invention here is provided a method of recovering sulphur form a feed gas stream comprising hydrogen sulphide, comprising separating air into an oxygen product stream and a nitrogen product stream, reacting as least part of the oxygen product stream with some of the hydrogen sulphide content of the feed gas in one or more furnaces to form sulphur dioxide and water vapor, and then allowing the so-formed sulphur dioxide to react with hydrogen sulphide in the furnace or furnaces to form a hot gas stream comprising unreacted hydrogen sulphide and sulphur dioxide, sulphur vapor and water vapor, and condensing sulphur from the hot gas stream, wherein at least some of the product nitrogen stream at a pressure of at least 2 atmospheres is used to extract heat from the hot gas, and is expanded in a turbine, useful work being recovered from the turbine.

The invention also provides apparatus for recovering sulphur from a feed gas comprising hydrogen sulphide, including air separation means for producing an oxygen product stream and a nitrogen product stream; at least one furnace for reacting at least part of the oxygen product stream with a part of the hydrogen sulphide content of the feed gas to form water vapor and sulphur dioxide, and for then allowing the so-formed sulphur dioxide to react with hydrogen sulphide to form a hot gas stream comprising sulphur vapor and water vapor and residual sulphur dioxide and hydrogen sulphide; at least one condenser for condensing sulphur from the hot gas stream means for heat exchanging at least part of the nitrogen product stream at a pressure of at least 2 atmospheres with the hot gas stream downstream of the furnace or at least 2 atmospheres with the hot gas stream downstream of the furnace or at least one of the furnaces to recover heat therefrom; a turbine for expanding the thus heated nitrogen, and means for recovering work from the expansion of the nitrogen.

The method and apparatus according to the present invention may be used either when combustion of hydrogen sulphide supported by pure oxygen or oxygen-enriched air takes place in a single furnace or a plurality of furnaces.

Preferably, at least part of the nitrogen is employed to extract heat from the hot gas stream by passage through at least one sulphur condenser through which the hot gas stream flows. Alternatively or in addition, the nitrogen can extract heat from the hot gas stream in at least one heat exchanger intermediate an outlet for hot gas from the furnace or at least one of the furnaces and a sulphur condenser.

The optimum pressure at which the nitrogen is brought into heat exchange relationship with the hot gas stream depends on the temperature of this gas stream. The higher the temperature of the gas stream, the higher is the preferred nitrogen stream pressure. For use in a sulphur condenser in which the temperature of the incoming sulphur containing gas stream may typically be in the range 275° C. to 325° C., the nitrogen is preferably at a pressure in the range of 2 to 5 atmospheres, more preferably 3 to 4.5 atmospheres. For heat exchange with hot gas intermediate the furnace, or one of the furnaces, and a sulphur condenser, the nitrogen is preferably at a pressure of at least 6 atmospheres, the temperature of the incoming gas stream being typically at least 1000° C. At such high temperatures, it is desirable to use a heat exchanger having ceramic heat exchange elements.

The nitrogen may be raised to the desired pressure by means of a compressor. Alternatively, when the nitrogen is required at a pressure of 5 atmospheres or under, the distillation column or columns used to separate the air may be arranged and operated such that the nitrogen stream is produced at the required elevated pressure so that no nitrogen compressor is required. Indeed, if the air is separated in a double column of the conventional kind, the lower pressure column may advantageously be operated at a pressure of from 3 to 4 atmospheres absolute, with a resulting increase in efficiency in comparison with conventional operation of such column at a pressure between 1 and 2 atmospheres absolute. Even if the nitrogen stream is required at a pressure higher than about 4 atmospheres absolute, it is advantageous to operate the lower pressure column at such a pressure and then compress the nitrogen to attain the desired pressure.

Typically, the heat exchange between the nitrogen and the hot gas stream containing sulphur vapour is performed in a direct gas-to-gas heat exchanger. An alternative is to use the hot gas to raise the temperature of the heat transfer medium (without changing the state of the medium) and use the medium to heat the nitrogen by heat exchange, again without the medium changing state. The medium may be a molten salt.

It is particularly preferred that all the sulphur condensers in an apparatus according to the invention employ nitrogen product as the fluid used to condense the sulphur. In such an example, it is possible to recover from nitrogen in the form of useful work at least half the work of compression performed in compressing the air upstream of its separation. Accordingly, there is a significant effective reduction in the cost of oxygen production. If necessary, the heat may be recovered by the nitrogen in two or more stages each comprising heat exchange and expansion, with the nitrogen being recompressed between each pair of stages.

Work can be recovered from the expansion of the nitrogen either by employing the turbine to drive one or more compressors, by employing the turbine to drive an alternator that generates electrical power, or by both these expedients.

BRIEF DESCRIPTION OF THE DRAWINGS

The method and apparatus according to the invention will now be described by way of example with reference to the accompanying drawings, in which:

FIG. 1 is a schematic flow diagram of a plant for recovering sulphur from a hydrogen sulphide containing gas stream;

FIG. 2 is a schematic flow diagram of an air separation plant for use in association with the sulphur recovery plant shown in FIG. 1 of the drawings.

DETAILED DESCRIPTION

Referring to FIG. 1 of the accompanying drawings, a first combustion region or furnace 2 is provided with a burner 4 for burning hydrogen sulphide. The burner has an inlet 6 for a stream of hydrogen sulphide rich gas mixture (typically containing at least 80% by volume of hydrogen sulphide) and an inlet 8 for a stream of substantially pure oxygen or oxygen-enriched air. All the oxygen supplied to the burner 4 is employed to support combustion of hydrogen sulphide. Sulphur dioxide and water vapour are formed as a result of this combustion. In addition, a small proportion (typically up to 5% by volume) of the hydrogen sulphide dissociates to form hydrogen and sulphur vapour. The amount of dissociation that takes place tends to increase with increasing flame temperature. Reaction between the thus formed sulphur dioxide and hydrogen sulphide takes place in a first thermal reaction region 10 (contiguous with the combustion region 2 and provided within the furnace 2) to form water vapour and sulphur vapour. No catalyst is employed in the region 10. The gas mixture leaving the thermal reaction region 10 enters a waste heat boiler 12 in which it is reduced in temperature, typically leaving the waste heat boiler 12 at a temperature in the region of 275° C. to 375° C.

The relative rates of supply of hydrogen sulphide-rich gas stream and the oxygen stream are set so as to give at the exit of the thermal reaction region 10 a flame temperature in the order to 1200° C. to 1500° C. In conventional Claus furnaces it is desired that one-third of the incoming hydrogen sulphide is converted to sulphur dioxide, as that a stoichiometric amount of sulphur dioxide is available for reaction with the residual hydrogen sulphide to form sulphur vapour and water vapour. In a conventional Claus furnace, air is used to support combustion, and there is thus generally little risk of exceeding at the exit of the thermal reaction region a flame temperature of about 1400° C. in achieving combustion of the stoichiometric amount of the hydrogen sulphide. In the method according to the invention, however, combustion in the region 2 of one third of the hydrogen sulphide in the stream 6 would tend to have the result of producing an unacceptably high flame temperature and/or an unacceptably high temperature at the inlet to the waste heat boiler 12. Accordingly, appreciably less than a third of the incoming hydrogen sulphide is burnt in the combustion region 2.

After leaving the waste heat boiler 12, the gas stream comprising hydrogen sulphide and sulphur dioxide, water vapour and sulphur vapour is passed through a sulphur condenser 14 in which it is cooled to a temperature of about 140° C. so as to condense the sulphur vapour. The resulting condensate is passed to a sulphur seal pit 38. The residual gas mixture than passes to the inlet 19 of a burner 18 located in a second combustion region or furnace 16. The burner 18 has an inlet 20 for oxygen-containing gas, preferably substantially pure oxygen or oxygen-enriched air. Sufficient of the hydrogen sulphide entering the burner 18 through the inlet 19 burns to form sulphur dioxide to reduce the ratio of hydrogen sulphide to sulphur dioxide in the gas mixture to approximately 2:1. The gas mixture than passes into a thermal reaction region 22 in which reaction between hydrogen sulphide and sulphur dioxide takes place to form sulphur vapour and water vapour. The gas mixture is then cooled to a temperature in the range 300° C. and 400° C. in a waste heat boiler 24. The second combustion region 16 and the second thermal reaction region 22 are defined in a single furnace which has a waste heat boiler 24 at its exit.

After its passage through the waste heat boiler 24, the gas mixture passes through a condenser 26 which condenses and removes sulphur from the stream at a temperature of about 140° C. The resulting sulphur free gas is then reheated in a heat exchanger 28 to a temperature in the order of 250° C. The sulphur is passed to the seal pit 38. The gas mixture is passed a reactor 30 containing a bed of a catalyst of the Claus reaction between hydrogen sulphide and sulphur dioxide. As a result of the passage of the gas mixture over the catalyst, the sulphur dioxide reacts with hydrogen sulphide. Further sulphur vapour is thus formed (as well as water vapour). In addition, in the event that the gas mixture contains any carbon disulphide or carbon oxysulphide, most or substantially all of these compounds will be hydrolysed at the prevailing exit temperature of 350° C. to 400° C. Since the catalytic reaction between hydrogen sulphide and sulphur dioxide is exothermic at these temperatures, the gas mixture leaves the catalytic reactor 30 at a higher temperature than it enters such reactor. The gas mixture is then passed through a condenser 32 in which it is cooled to a temperature of 140° C. so as to condense the sulphur vapour it contains, the condensate being passed to the sulphur seal pit 38. The gas mixture leaving the condenser 32 is free of sulphur vapour and is reheated in heat exchanger 34 to a temperature in the range 200° C. to 250° C. A further portion of hydrogen sulphide and a further portion of sulphur dioxide react with one another to form sulphur vapour and water vapour through a second catalytic reactor 36 containing a bed of suitable catalyst. The resulting gas mixture passes into a further condenser 40 in which sulphur is condensed. The condensed sulphur is passed to the sulphur seal pit 38, while the remainder of the gas mixture, now free of sulphur vapour, typically passes to a tail gas clean-up unit 42 with, if desired, a further sequence (not shown) of reheating, catalytic reaction between hydrogen sulphide and sulphur dioxide, and sulphur extraction upstream of the unit 42.

The tail gas clean-up unit 42 may be of the conventional kind being selected from, for example, plants for performing the Scot and Beavon processes.

Typically, the combustion region 2 is operated at a pressure a little above atmospheric pressure. For example, the pressure in the furnace in which the combustion region 2 is defined may be in the range 1.5 to 2 atmospheres absolute.

In the plant shown in FIG. 1, cooling for the sulphur condensers 14, 26, 32 and 40 is provided in accordance with the invention by compressed nitrogen. A stream of nitrogen is supplied at a pressure of 4 bar absolute from an air separation plant (not shown). The nitrogen is divided into two subsidiary streams. One subsidiary stream is passed through the condenser 14 and the other through the condenser 25, thereby producing the necessary cooling to dense the sulphur therein. Each subsidiary stream leaves its respective condenser at a temperature of about 350° C. The streams are then recombined and expanded in a second turbine 56. The turbine 56 has no combustion chamber associated therewith. It is driven solely by the energy of the compressed nitrogen. The nitrogen is expanded in the turbine 56 to a pressure of approximately atmospheric pressure and vented to the atmosphere. If desired, one of the turbines 52 and 56 may be coupled to the compressor 54 and thus provide the drive for the compressor 54. In addition, both turbines may be used to drive alternators 58 and thereby generate electricity.

Referring to FIG. 2 of the drawings, there is shown an air separation plant suitable for producing oxygen and nitrogen for use in the plant shown in FIG. 1. Referring to FIG. 2 of the drawings, air is supplied at a chosen pressure from the outlet of an air compressor 60. The air is passed through a purification apparatus 62 effective to remove water vapour and carbon dioxide from the compressed air. The apparatus 62 is of the kind which employs beds of adsorbent to adsorb water vapour and carbon dioxide from the incoming air. The beds may be operated out of sequence with one another such that while one or more beds are being used to purify air, the others are being regenerated, typically by means of a stream of nitrogen. The purified air stream is divided into major and minor streams.

The major stream passes through a heat exchanger 64 in which its temperature is reduced to a level suitable for the separation of the air by cryogenic rectification. Typically, therefore, the major air stream is cooled to its saturation temperature at the prevailing pressure. The major air stream is then introduced through an inlet 66 into a higher pressure rectification column 68 in which it is separated into oxygen-enriched and nitrogen fractions.

The higher pressure rectification column 68 forms part of a double column arrangement. The other column of the double column arrangement is a lower pressure rectification column 70. Both rectification columns 68 and 70 contain liquid-vapour contact trays (not shown) and associated downcomers (not shown) (or other means for effecting intimate contact between a descending liquid phase and an ascending vapour phase) whereby a descending liquid phase is brought into intimate contact with an ascending vapour phase such that mass transfer occurs between the two phases. The descending liquid phase becomes progressively richer in oxygen and the ascending vapour phase progressively richer in nitrogen. Typically, the higher pressure rectification column 68 operates at a pressure substantially the same as that to which the incoming air is compressed. The column 70 is preferably operated so as to give substantially pure nitrogen fraction at its top but an oxygen fraction at its bottom which still contains an appreciable proportion of nitrogen (say 5% by volume).

The columns 68 and 70 are linked by a condenser-reboiler 72. The condenser-reboiler 72 receives nitrogen vapour from the top of the higher pressure column 68 and condenses it by heat exchange with boiling liquid oxygen in the column 70. The resulting condensate is returned to the higher pressure column 68. Part of the condensate provides reflux for the column 68 while the remainder is collected, sub-cooled in a heat exchanger 74 and passed into the top of the lower pressure column 70 through an expansion valve 76 and thereby provides reflux for the column 70. The lower pressure rectification column 70 operates at a pressure lower than that of the column 68 and receives oxygen-nitrogen mixture for separation from two sources. The first source is the minor air stream formed by dividing the stream of air leaving the purification apparatus 62. Upstream of its introducing into the column 70, the minor air stream is compressed in a compressor 78, is then cooled to a temperature of about 200 K in the heat exchanger 64, is withdrawn from the heat exchanger 64 and is expanded in an expansion turbine 80 to the operating pressure of the column 70, thereby providing refrigeration for the process. This air stream is then introduced into the column 70 through inlet 82. If desired, the expansion turbine 80 may be employed to drive the compressor 78, or alternatively the two machines, namely the compressor 78 and the turbine 80, may be independent of one another. If desired, the compressor 78 may be omitted, and the turbine 80 used to drive an electrical power generator (not shown).

The second source of oxygen-nitrogen mixture for separation in the column 70 is a liquid stream of oxygen-enriched fraction taken from the bottom of the higher pressure column 68. This stream is withdrawn through an outlet 84, is sub-cooled in a heat exchanger 86 and is then passed through a Joule-Thomson valve 88 and flows into the column 70 at an intermediate level thereof.

The apparatus shown in FIG. 2 of the drawings produces a product oxygen stream and a product nitrogen stream. The product oxygen is withdrawn as vapour from the bottom of the lower pressure column 70 through an outlet 90. This stream is then warmed to approximately ambient temperature in the heat exchanger 64 by countercurrent heat exchange with the incoming air. The oxygen stream is used to support the combustion of the hydrogen sulphide in the furnace of the Claus plant shown in FIG. 1. A nitrogen product stream is taken directly from the top of the lower pressure column 70 through an outlet 92. This nitrogen stream flows through the heat exchanger 82 counter-currently to the liquid nitrogen stream withdrawn from the higher pressure column 68 and effects the sub-cooling of this stream. The nitrogen product stream then flows through the heat exchanger 86 counter-currently to the liquid stream of oxygen-enriched fraction and effects the sub-cooling of this liquid stream. The nitrogen stream then flows through the heat exchanger 64 counter-currently to the major air stream and is thus warmed to approximately ambient temperature. The nitrogen stream is used to provide the cooling for the sulphur condensers shown in FIG. 1.

Preferably, the air compressor 60 is operated at a pressure of about 13 bar absolute such that the high pressure column 68 operates at an average pressure of about 12.9 bar absolute and the lower pressure column 70 at an average pressure of about 4.2 bar absolute. Accordingly, the product oxygen and product nitrogen streams are able to be produced at about 4 bar thereby obviating the need for any product oxygen or product nitrogen compressor.

We have calculated the power consumption of the plant shown in FIGS. 1 and 2 on the basis of a production of 3,000 tonnes per day of sulphur using 1,900 tonnes per day of oxygen product of 95% purity. That is we have calculated the power consumption of the compressor 54 shown in FIG. 1 and the compressor 60 shown in FIG. 2, and the possible power recoveries from the turbines 52 and 56 shown in FIG. 1 based on the above-mentioned rates of production of oxygen and sulphur. It has been assumed for the purposes of this calculation, the air compressor is operated at 13 bar absolute and the expansion turbines 52 and 56 each have an inlet pressure of 3.8 bar and an outlet pressure of 1 bar. We calculate that the air compressor 60 has a power consumption of 30 MW, the nitrogen compressor 54 a power consumption of 10.4 MW, while 15.6 MW can be recovered from the expansion turbine 52 and 13.3 MW from the expansion turbine 56. Thus, the net power consumption is 11.5 MW.

If the sulphur condensers are operated conventionally, that is using superheated stream s the source of coolant rather than nitrogen, then the nitrogen becomes a waste product and it is inefficient to produce it at elevated pressure. Accordingly, the nitrogen is provided at just over 1 bar absolute pressure and hence the air compressor is typically operated at a pressure of about 6.8 bar. Its power consumption is 20 MW. In addition, there will be a need for an oxygen compressor to raise the oxygen to a pressure of 4 bar. The work to be done by this oxygen compressor can be reduced by producing a liquid oxygen product, sending it to storage, and then withdrawing liquid oxygen from storage under a head of liquid and vaporising it by heat exchange such that the resultant oxygen has a pressure in the order of 2 bar. Accordingly, the oxygen compressor will need to raise its pressure from 2 to 4 bar. We calculate that the power consumption in this instance will be 1.8 MW assuming a 65% isothermal efficiency of oxygen compression. Hence, the total net power consumption is 21.8 MW which compress unfavourably with the 11.5 MW power consumption of the method according to the invention.

I claim:

1. A method of recovering sulphur from a feed gas stream comprising hydrogen sulphide, comprising: separating air into an oxygen product stream and a nitrogen product stream; reacting at least part of the oxygen product stream with some of the hydrogen sulphide content of the feed gas in one or more furnaces to form sulphur dioxide and water vapour, and then allowing the so-formed sulphur dioxide to react with hydrogen sulphide in the furnace or furnaces to form a hot gas stream comprising unreacted hydrogen sulphide and sulphur dioxide, sulphur vapour and water vapour; condensing sulphur from the hot gas stream by indirectly exchanging heat between at least some of the product nitrogen stream at a pressure of at least 2 atmospheres and the hot gas stream; expanding the at least some of the product nitrogen stream in a first turbine with useful work being recovered from the first turbine; downstream of the first turbine, recompressing the at least some of the nitrogen product stream to at least two atmospheres; condensing further sulphur from the hot gas stream by indirectly exchanging the heat between the at least some of the nitrogen product stream with the hot gas stream; and expanding the at least some of the nitrogen product stream in a second turbine with the recovery of useful work.

2. The method as claimed in claim 1, in which the heat exchange between the hot gas stream and the product nitrogen stream takes place in at least one sulphur condenser.

3. The method as claimed in claim 2, in which the product nitrogen stream is employed in the at least one sulphur condenser at a pressure in the range of 2 to 5 atmospheres.

4. The method as claimed in claim 3, in which said pressure is in the range of 3 to 4.5 atmospheres.

5. The method as claimed in claim 1, in which the nitrogen product stream is withdrawn from a distillation column at a pressure such that it does not require compression upstream of its heat exchange with the hot gas stream.

6. The method as claimed in claim 1, in which the product nitrogen stream is withdrawn from a distillation column at a pressure in the range of 3 to 4.5 atmospheres.

7. The method as claimed in claim 1, in which the nitrogen is introduced into heat exchange relationship with the hot gas stream at a pressure of at least 6 atmospheres.

8. An apparatus for recovering sulphur from a feed gas comprising hydrogen sulphide, including: air separation means for producing an oxygen product stream and a nitrogen product stream; at least one furnace for reacting at least part of the oxygen product stream with a part of the hydrogen sulphide content of the feed gas to form water vapour and sulphur dioxide, and for then allowing so formed sulphur dioxide to react with hydrogen sulphide to form a hot gas stream comprising sulphur vapour, water vapour and residual sulphur dioxide and hydrogen sulphide; at least one condenser for condensing sulphur from the hot gas stream including means for indirectly exchanging heat between at least part of the nitrogen product stream at a pressure of at least 2 atmospheres and the hot gas stream downstream of the at least one furnace; a first turbine for expanding the thus heated at least part of the nitrogen product stream; first means for recovering work from the expansion of the at least part of the nitrogen product stream; a compressor for recompressing the thus expanded at least part of the nitrogen product stream to at least 2 atmospheres; condenser means for condensing sulphur from the hot gas stream including further means for indirectly exchanging heat between said at least part of the nitrogen product stream with the hot gas stream downstream of the compressor; a second turbine for expanding the thus re-heated said at least part of the nitrogen product stream; and second means for recovering work from the expansion of the at least part of the nitrogen product stream.

* * * * *